United States Patent Office 2,715,111
Patented Aug. 9, 1955

2,715,111
ORGANO TIN COMPOUNDS AND COMPOSITIONS CONTAINING SAME

Elliott L. Weinberg, Long Island City, N. Y., assignor to Metal & Thermit Corporation, New York, N. Y., a corporation of New Jersey No Drawing. Application December 21, 1953,
Serial No. 399,627
9 Claims. (Cl. 260—45.4)

The invention relates to a polymer containing organotin components, to the method of making the same and to a resin containing this polymer as a stabilizer. This application is a continuation in part of application Serial No. 235,673, filed July 7, 1951, now abandoned.

An alkyd in its simplest form is a polymeric ester resulting from the reaction of a polyhydric alcohol with a polycarboxylic acid. It has been found in accordance with the present invention that hydrocarbontin oxides may be substituted for a reactive portion of either the polyhydric alcohol or the polycarboxylic acid to produce a new series of useful polymers in the form of alkyds containing hydrocarbontin residues.

It has also been found in accordance with the present invention that these new polymers dispersed at low concentration in vinyl resins and especially polyvinyl chloride resins, act as stabilizers in reducing to a substantial extent the breakdown of the vinyl plastic when exposed to heat or light.

In accordance with the present invention, the new compound may be prepared by reacting alkyd forming ingredients and especially a polyhydric alcohol and a polycarboxylic acid with a hydrocarbontin compound (i. e. a compound having a hydrocarbon radical connected to the tin atom through a carbon atom of said radical) preferably in the form of a hydrocarbontin oxide such as a dialkyl, or diaryl or diaralkyl tin oxide. The resulting compound will be an alkyd whose chain includes tin atoms in which tin atoms are joined to oxygen of the alkyd, each of said tin atoms being joined by C—Sn bonds to two organic groups derived from the hydrocarbon tin oxide. Suitable hydrocarbon tin oxides include dimethyltin-, diethyltin-, dipropyltin-, dibutyltin-, dihexyltin-, dilauryltin-, diphenyltin- and dibenzyltin-oxides.

Any polyhydric alcohol may be used but it is preferred to use one having two reactive hydroxyl groups such as ethylene glycol, polyethylene glycol, monoesters of trihydric alcohols or further esterified alcohols of higher functionality.

The polycarboxylic acid may be sebacic, adipic, mellitic (acid or anhydride form), phthalic (acid or anhydride form), maleic (acid or anhydride form), fumaric acid and the like. In the claims herein by "polycarboxylic acid" is intended this compound not only in acid form but also in anhydride form.

In order to produce a polymeric compound having the desired physical characteristics, suitable agents for retarding the length of the polymeric chains formed or for limiting extent of polymerization and specifically a monocarboxylic acid or a monohydric alcohol may be added. The monocarboxylic acid may for example be a fatty acid such as stearic acid or may be an unsaturated acid such as oleic or linoleic acid. The monohydric alcohol which may be used as a modifying agent may be of any suitable type, as for example butyl alcohol.

Some change in the physical characteristics of the polymeric compound of the present invention may be obtained by using a partially esterified polyhydric alcohol instead of an unreacted polyhydric alcohol as one of the alkyd forming ingredients.

The resulting polymeric compounds are viscous liquids or pastes, whitish and light yellow to amber in color and are linear or cross-linked according to the functional characteristics of the reactants. These products may contain incompletely reacted ingredients; reaction, with consequent increase in degree of polymerization, continues when they are employed as resin stabilizers.

The following examples illustrate certain ways in which the principle of the invention has been applied, but is not to be construed as limiting the broader aspects of the invention.

EXAMPLE 1

Seventy-five (75) grams (.2 mol) of glyceryl monoricinoleate were reacted with 25 grams (.1 mol) of dibutyltin oxide and 20 grams (.1 mol) of phthalic anhydride. These reactants were heated in an open beaker until all the material was compatible. The temperature necessary to reach this condition was 160° to 170° C. and the heating time was 15 minutes. The resulting product was amber in color and viscous in nature.

It should be noted that in the method of Example 1, the phthalic anhydride and the dibutyltin oxide are permitted to react with the reactive hydroxyl groups in the glyceryl monoricinoleate. Since there are three hydroxyl groups in the glyceryl monoricinoleate, it is tri-functional. The dibutyltin oxide and the acid anhydride are bi-functional. Thus a cross-linked polymer results. As a general rule, the cross-linked polymer may be evidenced by its high viscosity.

EXAMPLE 2

Sixty-eight (68) grams of ethylene glycol monoricinoleate were reacted with 25 grams of dibutyltin oxide and 30 grams of phthalic anhydride. The mixture was heated to 120° C. for 15 to 20 minutes. The resulting product was an amber liquid of lower viscosity than the product of Example 1.

Since the ethylene glycol monoricinoleate in the method of Example 2 has two reactive hydroxyl groups, the resulting polymer is linear. As a general rule, the linear characteristic of a polymer is evidenced by its low viscosity.

EXAMPLE 3

Sixty-eight (68) grams of ethylene glycol monoricinoleate were reacted with 25 grams of dibutyltin oxide and 20 grams of maleic anhydride at 120° C. for 15 to 20 minutes. The resulting product was clear and somewhat viscous.

EXAMPLE 4

Seventy-five (75) grams of glyceryl monoricinoleate, 25 grams of dibutyltin oxide and 20 grams of maleic anhydride were heated together at 150° to 160° C. for 30 minutes. The resulting product was a clear viscous fluid.

EXAMPLE 5

Seventy-five (75) parts of glyceryl monooleate, 25 parts of dibutyltin oxide and 20 parts of maleic anhydride were heated together between 180° and 200° C. for about ½ hour, until a clear amber colored fluid material was obtained.

EXAMPLE 6

Seventy-five (75) parts of glyceryl monostearate, 25 parts of dibutyltin oxide and 20 parts of maleic anhydride were heated together between 180° and 200° C. for about ½ hour. The resulting product had the appearance of a whitish wax.

EXAMPLE 7

Seventy-five (75) parts of glyceryl monolaurate, 25 parts of dibutyltin oxide and 20 parts of maleic anhydride were heated together between 180° and 200° C. for about ½ hour. The resulting product was a light semi-solid.

EXAMPLE 8

Seventy-five (75) parts of glyceryl monohydroxystearate, 25 parts of dibutyltin oxide and 20 parts of maleic anhydride were heated together between 180° and 200° C. for about ½ hour. The resulting product was a gummy substance between the consistency of a wax and thick liquid.

EXAMPLE 9

Seventy-five (75) parts of glyceryl monoricinoleate, 25 parts of dibutyltin oxide and 40 parts of sebacic acid were heated together between 180° and 200° C. for about ½ hour. The product resulting was a tan waxy substance.

EXAMPLE 10

Seventy-five (75) parts of glyceryl monoricinoleate, 25 parts of dibutyltin oxide and 23 parts of fumaric acid were heated together between 180° and 200° C. for about one hour. The resulting product was a yellow semi-solid.

EXAMPLE 11

Seventy-five (75) parts of glyceryl monoricinoleate, 25 parts of dibutyltin oxide and 30 parts of adipic acid were reacted together at a temperature of between 180° and 200° C. for about ½ hour. The resulting product was a tan crystalline waxy substance.

EXAMPLE 12

Maleic anhydride 39.2 grams, butyl alcohol 14.8 grams, glycerol monoricinoleate 111.5 grams, and dibutyl tin oxide 37.3 grams were reacted according to the following schedule. The maleic anhydride was dissolved in butyl alcohol, the glycerol monoricinoleate and the dibutyl tin oxide were then added and the mixture was heated rapidly. Total heating time was two hours and the final pot temperature was 150° C. at which temperature the mixture was held for one hour. The resulting product had a viscosity which was considerably lower than that of the material prepared in Example 4.

EXAMPLE 13

Maleic anhydride 47.2 grams, dibutyl tin oxide 50 grams, 9,11 linoleic acid 110 grams, ethylene glycol 63 grams were heated in a dry nitrogen atmosphere to a temperature of 200° C. and held there for three hours.

EXAMPLE 14

Diphenyl tin oxide (10 pts.), glycerol monoester of cottonseed oil (25.85 pts.), and maleic anhydride (6.9 pts.) were heated and stirred together at 160-180° C. for 15 minutes. The resulting product was transparent, gummy and had an orange hue.

EXAMPLE 15

Diphenyl tin oxide (10 pts.), glycerol monoester of lard oil (25.85 pts.) and maleic anhydride (6.9 pts.) were heated and stirred together at 160-180° C. for 15 minutes. The product was transparent, hard and orange in color.

EXAMPLE 16

Dimethyl tin oxide (16.5 pts.), glycerol monoricinoleate (75 pts.) and maleic anhydride (20 pts.) were heated and stirred together at 185-210° C. for 15 minutes. The product was a solid.

EXAMPLE 17

Dimethyl tin oxide (16.5 pts.), glycerol monoester of cottonseed oil (75 pts.) and maleic anhydride (20 pts.) were heated and stirred together at 160-220° C. for 30 minutes. The product was a semi-solid.

EXAMPLE 18

Diphenyl tin oxide (10 pts.), glycerol monoester of cottonseed oil (25.85 pts.) and sebacic acid (13.8 pts.) were heated and stirred together at 160-185° C. for 15 minutes. The product was a viscous, green-tinted liquid.

EXAMPLE 19

Diphenyl tin oxide (10 pts.), glycerol monoricinoleate (25.85 pts.) and adipic acid (10.3 pts.) were heated and stirred together at 150-160° C. for 15 minutes. A semi-solid product resulted.

The tin contents of the polymer in the examples illustrated, vary from five to fifteen per cent by weight with the bulk of the example products having about 10% tin.

The polymers of the present invention may be effectively used as stabilizers in vinyl resins and especially vinyl resins containing chlorine, such as polyvinyl chloride. As already indicated, the products of the present invention when first applied to these resins are incomplete as regards the degree of polymerization and become more complete when added to the resin.

The hydrocarbontin polymers may be effectively used in concentrations varying from 1 to 10 parts by weight to 100 parts of the resin. The preferred concentration for a polymer containing 10% tin is 2 to 4 parts per 100 parts of the resin.

The incorporation of the hydrocarbontin polymer in the vinyl resin imparts a definite thermal stability to the resin which is not inherent in the untreated resin. An outstanding characteristic of the resins stabilized with hydrocarbontin polymers is the clarity of the film and the glossy texture thereof. There is no bleeding or sweating of the stabilized resin on standing at room temperature for over six months.

In accordance with specific tests, the stabilizers produced in the Examples 1-11 were incorporated respectively into a mixture of 100 parts by weight of Geon 101 (polyvinyl chloride resin produced by B. F. Goodrich Co.) and 50 parts by weight of a plasticizer (Flexol, dioctyl phthalate). The weight of the stabilizer was used to provide the same weight of combined tin as is provided by two parts of dibutyltin dilaurate. This was done in order to have a means of determining the relative merits of the various compounds.

The mixture was then milled for five minutes on a two-roll differential speed mill heated to 320-325° F. and removed as a sheet. Portions of the sheet were then placed in a single cavity mold (6" x 6" x 40 mils) preheated to 275° F. The mold was then placed on a press and raised to 320° F. under 10,000 pounds total pressure. When the mold reached 320° F., the pressure was increased to 40,000 pounds and held until the temperature reached 320° F. This procedure required 5 to 5½ minutes. The mold and press platens were then cooled and the pressed sheet removed.

The pressed sheet was cut into 1" x 6" strips and placed to hang vertically in clips on a tray. The tray was placed in a circulating air oven held at 320° F. Samples were removed after 1 hour, 2 hours, 3 hours and 4 hours of heat aging and were rated visually. The following table shows the result of these tests.

Table

Code: c, colorless; vsy, very slight yellow; sy, slight yellow; y, yellow; rbr, reddish brown; br, brown; bl, black; ble, black at edges.

| Stabilizer from Example No. | Appearance after heat aging | | | |
|---|---|---|---|---|
| | 1 hr. | 2 hrs. | 3 hrs. | 4 hrs. |
| No stabilizer | rbr | bl | | |
| Dibutyltin dilaurate, 2 parts/100 parts of resin | y | y | ble | bl |
| Example 1 | sy | sy | y | rbr |
| Example 2 | sy | sy | y | rbr |
| Example 3 | sy | sy | y | rbr |
| Example 4 | sy | sy | sy | y |
| Example 5 | vsy | sy | sy | y |
| Example 6 | vsy | sy | sy | y |
| Example 7 | vsy | sy | sy | y |
| Example 8 | vsy | sy | sy | y |
| Example 9 | vsy | y | y | rbr |
| Example 10 | vsy | sy | sy | y |
| Example 11 | vsy | y | y | rbr |

The stabilization results obtained by the products of examples 12 and 13 are fully comparable with the best obtained in accordance with examples 1-11.

Stabilizers of examples 14, 15, 16 and 18 were incorporated into a mixture of 100 parts by weight of Geon 101 EP, 50 parts dioctyl phthalate and 2 parts of the specific stabilizer. The mixture was milled as heretofore described, cut into strips and oven-aged at 350° F. for one hour. The results were as follows:

| Stabilizer | Color | | | | |
|---|---|---|---|---|---|
| | Milled Sheet | ¼ hr. | ½ hr. | ¾ hr. | 1 hr. |
| Ex. 14 | 6 | 6 | 4 | 4 | 1 |
| Ex. 15 | 6 | 5 | 4 | 1 | 1 |
| Ex. 16 | 6 | 5 | 4 | 3 | 3 |
| Ex. 18 | 6 | 5 | 4 | 1 | 1 |
| None | 3 | 2 | 1 | 1 | 1 |

The numbers have the following meanings:
1—dark amber (or worse)
2—light amber
3—tan
4—yellow
5—pale yellow
6—faint yellow
7—colorless While the invention has been described with particular reference to specific embodiments, it is to be understood that it is not to be limited thereto, but is to be construed broadly and restricted solely by the scope of the appended claims.

I claim:

1. A method of preparing an alkyd polymer comprising reacting together a polycarboxylic acid, a polyhydric alcohol and a hydrocarbontin oxide.

2. An alkyd polymer whose chain includes tin atoms in which tin atoms are joined to oxygen of the alkyd, each of said tin atoms being joined by C—Sn bonds to two hydrocarbon groups derived from a hydrocarbontin oxide.

3. An alkyd according to claim 2 wherein a modifying agent selected from the class consisting of a monocarboxylic acid and a monohydric alcohol is incorporated therein during the formation of the alkyd.

4. As a composition of matter, a chlorine containing vinyl resin and a stabilizing amount of the compound set forth in claim 2.

5. As a composition of matter, a chlorine containing vinyl resin and a stabilizing amount of a compound set forth in claim 3.

6. An alkyd according to claim 2 wherein tin atoms are joined to oxygen of residues resulting from the removal of hydrogen from the reactive groups of compounds selected from the class consisting of polycarboxylic acids and polyhydric alcohols.

7. An alkyd according to claim 6 wherein a modifying agent selected from the class consisting of a monocarboxylic acid and a monohydric alcohol is incorporated therein during the formation of the alkyd.

8. As a composition of matter, a chlorine containing vinyl resin and a stabilizing amount of a compound set forth in claim 6.

9. As a composition of matter, a chlorine containing vinyl resin and a stabilizing amount of a compound set forth in claim 7.

References Cited in the file of this patent
FOREIGN PATENTS 588,549   Great Britain _____ May 27, 1947